United States Patent
Torii (10) Patent No.: US 10,369,995 B2
(45) Date of Patent: Aug. 6, 2019

(54) INFORMATION PROCESSING DEVICE, INFORMATION PROCESSING METHOD, CONTROL DEVICE FOR VEHICLE, AND CONTROL METHOD FOR VEHICLE

(71) Applicant: FUJI JUKOGYO KABUSHIKI KAISHA, Tokyo (JP)

(72) Inventor: Takeshi Torii, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 190 days.

(21) Appl. No.: 15/363,777

(22) Filed: Nov. 29, 2016

(65) Prior Publication Data
US 2017/0151945 A1      Jun. 1, 2017

(30) Foreign Application Priority Data

Nov. 30, 2015   (JP) ................................. 2015-233450

(51) Int. Cl.
| | | |
|---|---|---|
| *G06K 9/00* | (2006.01) | |
| *G08G 1/01* | (2006.01) | |
| *G08G 1/16* | (2006.01) | |
| *B60W 30/12* | (2006.01) | |

(Continued)

(52) U.S. Cl.
CPC ............ *B60W 30/12* (2013.01); *B60W 40/04* (2013.01); *G08G 1/0112* (2013.01); *G08G 1/0125* (2013.01); *G08G 1/0129* (2013.01); *G08G 1/0133* (2013.01); *G08G 1/0141* (2013.01); *G08G 1/096725* (2013.01); *G08G 1/096758* (2013.01); *G08G 1/096775* (2013.01); *G08G 1/166* (2013.01); *G08G 1/167* (2013.01); *G06K 9/00798* (2013.01)

(58) Field of Classification Search
CPC ............ B60W 30/12; B60W 40/02–06; G08G 1/0112; G08G 1/0125; G08G 1/0129; G06K 9/00798
USPC ........................................................ 701/117
See application file for complete search history.

(56) References Cited

U.S. PATENT DOCUMENTS

| | | | |
|---|---|---|---|
| 2016/0305787 A1 | 10/2016 | Sato et al. | |
| 2016/0375912 A1* | 12/2016 | Christensen | ...... B60W 50/0097 701/25 |
| 2018/0015919 A1* | 1/2018 | Hanzawa | .............. B60W 50/14 |

FOREIGN PATENT DOCUMENTS

| | | |
|---|---|---|
| JP | 2004-126888 | 4/2004 |
| JP | 2004-126888 A | 4/2004 |
| JP | 2005-092320 A | 4/2005 |

(Continued)

OTHER PUBLICATIONS

Office Action for JP Patent Application No. 2015-233450, dated Feb. 27, 2018, 04 pages of Office Action and 03 pages of English Translation.

(Continued)

*Primary Examiner* — Krishnan Ramesh
(74) *Attorney, Agent, or Firm* — Chip Law Group (57) ABSTRACT

An information processing device includes circuitry configured to acquire, from vehicles each of which has a lane keeping function of allowing each of the vehicles to travel along a lane, a use information of the lane keeping function during a travel, extract a region in which a use rate of the lane keeping function is low, on the basis of the use information, and transmit a notification information based on the use rate to a given vehicle having the lane keeping function.

16 Claims, 6 Drawing Sheets

| SECTION | TIME | WEATHER | NUMBER OF VEHICLES | TEMPORARY STOP P1 | DETERMINATION (ESTIMATED CAUSE) | SYSTEM OPERATION | NOTES |
|---|---|---|---|---|---|---|---|
| C | OVERALL | OVERALL | - | 50% | - | REFLECTED ON MAP INFORMATION | *JUST ALERT DRIVER BECAUSE IT IS ALSO POSSIBLE TO TRAVEL WITHOUT TEMPORARILY STOPPING LANE KEEPING FUNCTION. (IT IS ALSO CONCEIVABLE TO ACCUMULATE CHANGES IN SAME SECTION OVER TIME, RECORD CASE HAVING CHANGE, AND DISPLAY REASON.) |
| | DAYTIME | SUNNY/CLOUDY | 45/100 | 45% | MEDIUM | DISPLAY ALERT AND GENERATE SOUNDS | |
| | | RAINY | 55/100 | 55% | MEDIUM | DISPLAY ALERT AND GENERATE SOUNDS | |
| | NIGHTTIME | SUNNY/CLOUDY | 40/100 | 40% | MEDIUM | DISPLAY ALERT AND GENERATE SOUNDS | |
| | | RAINY | 60/100 | 60% | MEDIUM | DISPLAY ALERT AND GENERATE SOUNDS | |

(51) Int. Cl.
*B60W 40/04* (2006.01)
*G08G 1/0967* (2006.01)

(56) References Cited

FOREIGN PATENT DOCUMENTS

| JP | 2011-118603 A | 6/2011 |
| JP | 2014-186398 A | 10/2014 |
| JP | 2015-141050 A | 8/2015 |
| JP | 2015-141101 A | 8/2015 |

OTHER PUBLICATIONS

Office Action received for Japanese Patent application No. 2015-233450, dated Jul. 18, 2017, 3 pages of office action and 4 pages of English translation.

* cited by examiner

| SECTION | TIME | WEATHER | NUMBER OF VEHICLES | TEMPORARY STOP P1 | DETERMINATION (ESTIMATED CAUSE) (SHAPES OF ROADS) | SYSTEM OPERATION | NOTES |
|---|---|---|---|---|---|---|---|
| A | OVERALL | OVERALL | - | 80% | | REFLECTED ON MAP INFORMATION | *IT IS ESTIMATED THAT SHAPES OF ROADS HAVE CONSIDERABLE INFLUENCE BECAUSE LANE KEEPING FUNCTION TEMPORARILY STOPS UNDER EVERY CONDITION<br>→REFLECTED ON MAP INFORMATION |
| | DAYTIME | SUNNY/CLOUDY | 80/100 | 80% | HIGH | FORCED TO TEMPORARILY STOP 100 m BEFORE | |
| | | RAINY | 70/100 | 70% | HIGH | FORCED TO TEMPORARILY STOP 100 m BEFORE | |
| | NIGHTTIME | SUNNY/CLOUDY | 90/100 | 90% | HIGH | FORCED TO TEMPORARILY STOP 100 m BEFORE | |
| | | RAINY | 80/100 | 80% | HIGH | FORCED TO TEMPORARILY STOP 100 m BEFORE | |

FIG. 5

| SECTION | TIME | WEATHER | NUMBER OF VEHICLES | TEMPORARY STOP P1 | DETERMINATION (ESTIMATED CAUSE) | SYSTEM OPERATION | NOTES |
|---|---|---|---|---|---|---|---|
| B | OVERALL | OVERALL | — | 47% | (RAINY) | REFLECTED ON MAP INFORMATION | *IT IS ESTIMATED THAT AREA IS EASILY FLOODED BECAUSE TEMPORARY STOP RATES ARE HIGH ONLY WHEN IT IS RAINY<br>⇒REFLECTED ON MAP INFORMATION |
|  | DAYTIME | SUNNY/ CLOUDY | 1/100 | 1% | LOW | NO CHANGE |  |
|  |  | RAINY | 90/100 | 90% | HIGH | FORCED TO TEMPORARILY STOP 100 m BEFORE |  |
|  | NIGHTTIME | SUNNY/ CLOUDY | 2/100 | 2% | LOW | NO CHANGE |  |
|  |  | RAINY | 95/100 | 95% | HIGH | FORCED TO TEMPORARILY STOP 100 m BEFORE |  |

FIG. 6

| SECTION | TIME | WEATHER | NUMBER OF VEHICLES | TEMPORARY STOP P1 | DETERMINATION (ESTIMATED CAUSE) | SYSTEM OPERATION | NOTES |
|---|---|---|---|---|---|---|---|
| C | OVERALL | OVERALL | - | 50% | - | REFLECTED ON MAP INFORMATION | *JUST ALERT DRIVER BECAUSE IT IS ALSO POSSIBLE TO TRAVEL WITHOUT TEMPORARILY STOPPING LANE KEEPING FUNCTION. |
| | DAYTIME | SUNNY/CLOUDY | 45/100 | 45% | MEDIUM | DISPLAY ALERT AND GENERATE SOUNDS | (IT IS ALSO CONCEIVABLE TO ACCUMULATE CHANGES IN SAME SECTION OVER TIME, RECORD CASE HAVING CHANGE, AND DISPLAY REASON.) |
| | | RAINY | 55/100 | 55% | MEDIUM | DISPLAY ALERT AND GENERATE SOUNDS | |
| | NIGHTTIME | SUNNY/CLOUDY | 40/100 | 40% | MEDIUM | DISPLAY ALERT AND GENERATE SOUNDS | |
| | | RAINY | 60/100 | 60% | MEDIUM | DISPLAY ALERT AND GENERATE SOUNDS | |

INFORMATION PROCESSING DEVICE, INFORMATION PROCESSING METHOD, CONTROL DEVICE FOR VEHICLE, AND CONTROL METHOD FOR VEHICLE

CROSS-REFERENCE TO RELATED APPLICATIONS

The present application claims priority from Japanese Patent Application No. 2015-233450 filed on Nov. 30, 2015, the entire contents of which are hereby incorporated by reference.

BACKGROUND

1. Technical Field

The present invention relates to an information processing device, an information processing method, a control device for a vehicle, and a control method for a vehicle.

2. Related Art

There are today vehicles having a lane keeping function of detecting a lane indicating a driving lane with an onboard camera and the like, and allowing the vehicles to travel along the lane. For example, Japanese Unexamined Patent Application Publication (JP-A) No. 2011-118603 discloses a method for notifying a passenger in advance that automatic control driving including lane keeping is unavailable in a section in which the automatic control driving is unavailable, and releasing the automatic control.

However, when the above-described lane keeping function is performed, lane lines in an image recognized by a camera do not allow the lane keeping function to be demonstrated in some cases because the lanes are worn out or dirty, or bad weather temporarily makes the lanes difficult to see. In such a case, conventional technology has the problem that the conventional technology has to temporarily stop the lane keeping function all of a sudden at the time when the lanes are difficult to recognize.

The technology described in JP-A No. 2011-118603 uses map data to determine that the automatic control driving including lane keeping is unavailable. Accordingly, if the lanes deteriorate after the map data is created, it is difficult to notify a driver. Meanwhile, there is the problem that a driver is notified that the lane keeping function is still unavailable even if the deteriorated lanes are restored after the map data is created. Further, it is difficult to notify a driver that it is impossible to use the lane keeping function when bad weather makes the lanes difficult to recognize.

SUMMARY OF THE INVENTION

It is desirable to provide a novel and improved information processing device, information processing method, control device for a vehicle, and control method for a vehicle which can notify a driver of a vehicle on the basis of real-time use information of a lane keeping function whether it is possible to use the lane keeping function.

An aspect of the present invention provides an information processing device including circuitry configured to: acquire, from vehicles each of which has a lane keeping function of allowing each of the vehicles to travel along a lane, a use information of the lane keeping function during a travel; extract a region in which a use rate of the lane keeping function is low, on the basis of the use information; and transmit a notification information based on the use rate to a given vehicle having the lane keeping function.

The circuitry may be configured to acquire a position information of the given vehicle having the lane keeping function. The circuitry may be configured to transmit the notification information to a vehicle traveling before the region.

The circuitry may be configured to transmit, as the notification information, an information requesting the lane keeping function to stop.

The circuitry may be configured to transmit, as the notification information, a warning information indicating a possibility that the lane keeping function temporarily stops.

The circuitry may be configured to transmit the notification information for the given vehicle to reflect the notification information on a map information of a navigation system.

The circuitry may be configured to calculate the use rate on the basis of the use information.

The circuitry may be configured to: acquire an environment information indicating environments outside the vehicles from the vehicles. The circuitry may be configured to calculate the use rate in accordance with the environment information for each region. The circuitry may be configured to transmit the notification information generated on the basis of the use rate and the environment information.

The environment information may be a time at which the lane keeping function temporarily stops, an information indicating an operation state of a windshield wiper at a time of a temporary stop of the lane keeping function, or an information indicating an operation state of a light at a time of a temporary stop of the lane keeping function.

The circuitry may be configured to transmit the notification information for stopping the lane keeping function when a temporary stop rate of the lane keeping function indicating the use rate is greater than or equal to a first threshold.

The circuitry may be configured to transmit, as the notification information, a warning information indicating a possibility that the lane keeping function stops when the temporary stop rate is less than the first threshold and greater than a second threshold.

The circuitry may be configured to generate the notification information on the basis of the use rate.

Another aspect of the present invention provides an information processing method including: acquiring, from vehicles each of which has a lane keeping function of allowing each of the vehicles to travel along a lane, a use information of the lane keeping function during a travel; extracting a region in which a use rate of the lane keeping function is low, on the basis of the use information; and transmitting a notification information based on the use rate to a given vehicle having the lane keeping function.

Still another aspect of the present invention provides a control device for a vehicle, the control device including circuitry configured to: acquire a use information of a lane keeping function of allowing the vehicle to travel along a lane; transmit the use information to a server; receive a notification information based on a use rate of the lane keeping function from the server for a region in which the use rate calculated by the server on the basis of the use information acquired from vehicles is low; and perform a processing for the lane keeping function on the basis of the notification information.

The circuitry may be configured to stop the lane keeping function on the basis of the notification information.

The circuitry may be configured to generate a warning indicating a possibility that the lane keeping function temporarily stops, on the basis of the notification information.

The circuitry may be further configured to change a map information of a navigation system on the basis of the notification information.

The circuitry may be configured to acquire an environment information. The circuitry may be configured to transmit the environment information along with the use information. The circuitry may be configured to receive the notification information based on the use rate calculated by the server in the region in accordance with the environment information.

The environment information may be a time at which the lane keeping function temporarily stops, an information indicating an operation state of a windshield wiper at a time of a temporary stop of the lane keeping function, or an information indicating an operation state of a light at a time of a temporary stop of the lane keeping function.

Yet another aspect of the present invention provides a control method for a vehicle, the control method including: acquiring a use information of a lane keeping function of allowing the vehicle to travel along a lane; transmitting the use information to a server; receiving a notification information based on a use rate of the lane keeping function from the server for a region in which the use rate calculated by the server on the basis of the use information acquired from vehicles is low; and performing a processing for the lane keeping function on the basis of the notification information.

DETAILED DESCRIPTION

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

Figure 1:
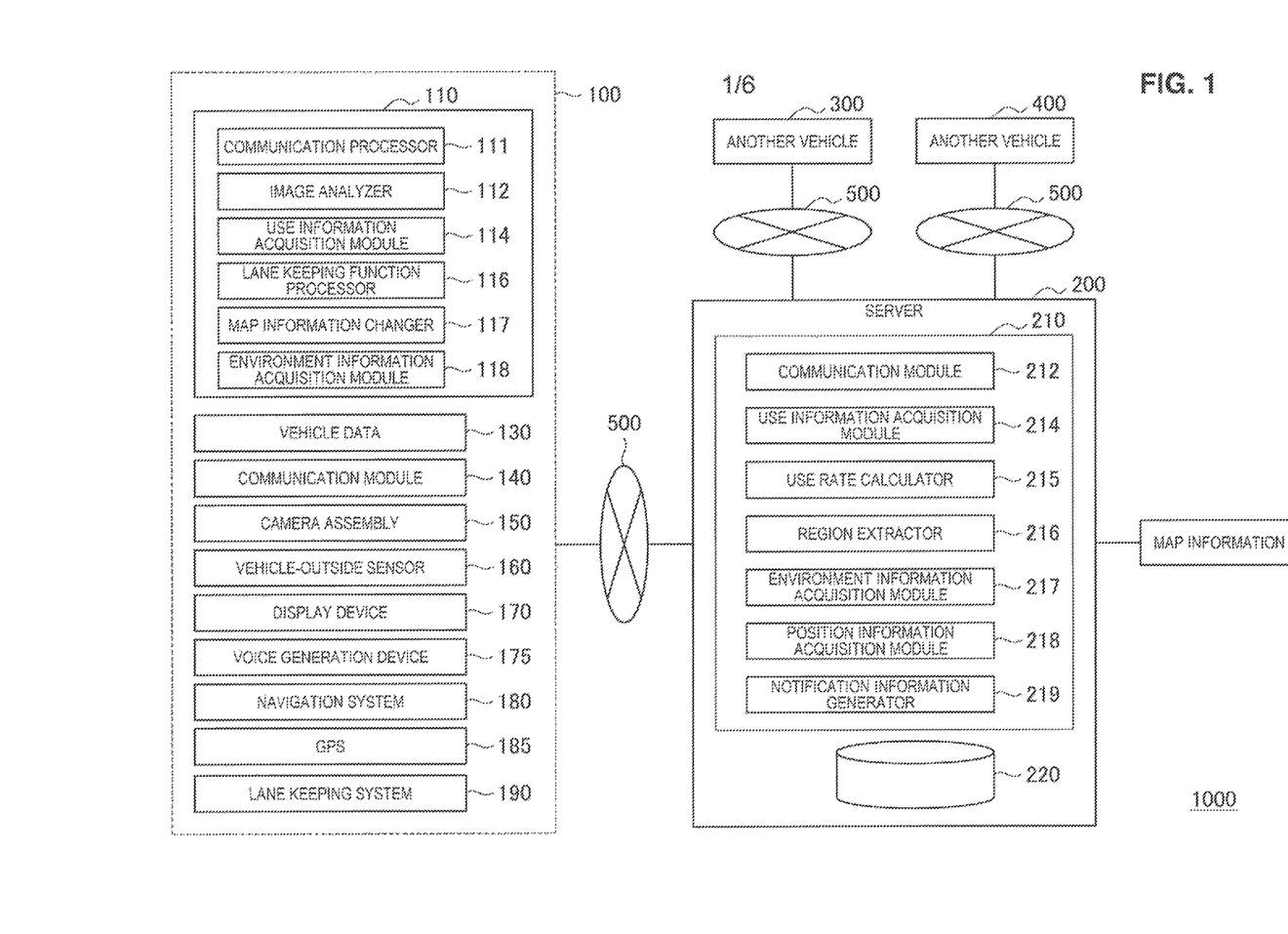
FIG. 1 is a schematic diagram illustrating a configuration of a control system for a vehicle according to an implementation of the present invention.

First of all, the configuration of a control system 1000 for a vehicle according to an implementation of the present invention will be described with reference to FIG. 1. FIG. 1 is a schematic diagram for describing the configuration of the control system 1000 for a vehicle according to an implementation of the present invention. As illustrated in FIG. 1, a vehicle 100 is capable of communicating with a server (management device) 200 in this control system 1000. The vehicle 100 is communicably coupled to the server 200, for example, via a network 500 such as the Internet, a mobile telephone network, a PHS network, a wireless LAN, WiMAX, a satellite telephone, and a beacon.

For example, the vehicle 100 and the server 200 may be coupled to base stations, for example, via the mobile telephone network, the PHS network, the wireless LAN, WiMAX, the satellite telephone and the beacon, and the base stations may be coupled to each other via the network 500.

The server 200 is coupled to other vehicles 300, 400 . . . like the vehicle 100. The vehicles 100, 300, 400 . . . according to the present implementation each have a lane keeping function. The lane keeping function is a function of detecting a lane (such as a lane line) on a road, and allowing the vehicle 100 to travel along the lane, and includes a function (lane deviation alarm) of notifying the driver whether the vehicle 100 is traveling along the lane. The lane keeping function further includes a function (lane deviation preventing function) of allowing the vehicle 100 to travel along the lane, for example, in accordance with either one of steering control and rear-wheel torque vectoring control.

The vehicle 100 includes a controller 110, a memory 130 that stores vehicle data and the like, a communication module 140 that transmits and receives information to and from the server 200, a camera assembly 150, a vehicle-outside sensor 160, a display device 170, a voice generation device 175, a navigation system 180, a GPS 185, and a lane keeping system 190. The controller 110 is, for example, composed of an electronic control unit (ECU), and includes a communication processor 111 that performs processing for communication with the server 200, an image analyzer 112, a use information acquisition module 114 that acquires use information of the lane keeping function, a lane keeping function processor 116 that performs processing for the lane keeping function, a map information changer 117 that changes map information, and an environment information acquisition module 118 that acquires environment information such as the operation state of a windshield wiper. The controller 110 can be configured with a central processing unit such as a CPU, and a program (software) that causes the controller 210 to function.

The camera assembly 150 included in the vehicle 100 images the vehicle outside, and acquires image information of the vehicle outside (image information, in particular, of the road surfaces in front of the vehicle 100, lanes indicating driving lanes, preceding vehicles, traffic lights, and various traffic signs). More preferably, the camera assembly 150 should include a stereo camera. In this case, the camera assembly 150 includes a symmetrical pair of cameras each equipped with an image sensor such as a CCD sensor and a CMOS sensor, images the outside environment of the vehicle 100, and sends the captured image information to the image analyzer 112 of the controller 110.

Based on the principle of triangulation, the image analyzer 112 can generate and acquire distance information on the distance to a target object (such as a preceding vehicle) from the disparities of the corresponding positions in a symmetrical pair of images obtained by the symmetrical pairs of cameras imaging the areas in the vehicle traveling direction. In addition, the image analyzer 112 can detect three-dimensional object data, lane line data, and the like by performing well-known grouping processing on the distance information generated on the basis of the principle of triangulation, and then comparing the distance information subjected to the grouping processing with preset three-dimensional object data and the like. This also allows the image analyzer 112 to recognize lanes indicating driving lanes, stop signs, stop lines, ETC gates, and the like.

Further, using distance information on the distance (inter-vehicle distance L) between a preceding vehicle and the vehicle 100 which is generated on the basis of the principle of triangulation, the image analyzer 112 can calculate the change amount of the inter-vehicle distance L and relative velocity V to the preceding vehicle. The change amount of the inter-vehicle distance L can be obtained by integrating the inter-vehicle distance L between frame images detected every unit time. The relative velocity V can be obtained by dividing the inter-vehicle distance detected every unit time by the unit time.

The vehicle-outside sensor 160 includes a radar sensor, a temperature sensor and the like, and acquires vehicle-outside environment information. The display device 170 is disposed close to the instrument panel of the vehicle 100, and displays map information acquired from the navigation system 180 while superimposing, for example, the current position and driving routes to the destination acquired by the GPS 185 on the map information. In addition, the display device 170 displays various kinds of information acquired from the server 200. The voice generation device 175 generates the voice and warning information of the navigation system 180. The navigation system 180 has map information, searches for a driving route to the destination, and causes the display device 170 to display the driving route along with the map information. In addition, the navigation system 180 calculates a route from the current location to the destination, the necessary time, the toll of the highway, and the like on the basis of the map information, and causes the display device 170 to display the distance, the necessary time, the toll, and the like. The GPS 185 acquires information on the current position. The information on the current position which is acquired by the GPS 185 is sent from the communication module 140 to the server 200.

The lane keeping system 190 is controlled by the lane keeping function processor 116 of the controller 110, and includes a steering device of the vehicle 100 and motors that perform torque vectoring control on the rear wheels of the vehicle 100. If the vehicle 100 is made to travel along a lane, the lane keeping function processor 116 of the controller 110 acquires information on the position of the lane from the image analyzer 112, controls the lane keeping system 190 in a manner that the vehicle 100 travels along the lane, and performs steering control and rear-wheel motor torque vectoring control. In addition, the lane keeping function processor 116 of the controller 110 acquires information on the position of the lane from the image analyzer 112. If the vehicle 100 deviates from the lane, the lane keeping function processor 116 of the controller 110 causes the display device 170 to display warning, and causes the voice generation device 175 to generate a voice and warning information. This lane keeping function can be performed by using existing technology. The configuration of the lane keeping system 190 is not limited in particular.

If it is difficult for the lane keeping function processor 116 of the controller 110 to recognize a lane with the camera assembly 150, the lane keeping function processor 116 of the controller 110 has a function of temporarily stopping the lane keeping function. Meanwhile, the lane keeping function processor 116 has a function of resuming the lane keeping function if the situation in which it is difficult to recognize a lane with the camera assembly 150 transitions to the situation in which it is possible to recognize a lane with the camera assembly 150.

Further, the lane keeping function processor 116 temporarily stops the lane keeping function if the lane keeping function processor 116 receives notification information requesting the lane keeping function to temporarily stop from the server 200. In addition, the lane keeping function processor 116 displays warning on the display device 170, and generates a voice, warning information, and the like from the voice generation device 175 if the lane keeping function processor 116 receives, from the server 200, notification information indicating the possibility that the lane keeping function temporarily stops.

The use information acquisition module 114 of the controller 110 acquires use information on the use state of the lane keeping function, and acquires information indicating, for example, whether the lane keeping function is normally used, or whether the lane keeping function temporarily stops because of the difficulty in recognizing a lane with the camera assembly 150. This use information is transmitted from the communication module 140 to the server 200 through the processing of the communication processor 111.

If the map information changer 117 of the controller 110 receives notification information indicating that map information is changed from the server 200, the map information changer 117 of the controller 110 changes the map information of the navigation system 180.

The environment information acquisition module 118 of controller 110 acquires information such as the operation states of the windshield wiper and lights of the vehicle 100, and the time at which the lane keeping function temporarily stops as environment information. The environment information acquisition module 118 may acquire the operation states of the windshield wiper and the lights, for example, on the basis of information from a rain sensor and an auto-light sensor at the upper part of the windshield. This environment information is transmitted from the communication module 140 to the server 200 through the processing of the communication processor 111.

The configurations of the other vehicles 300, 400 . . . coupled to the server 200 are similar to the configuration of the vehicle 100. In this way, the server 200 is communicably coupled to a large number of vehicles each of which has a lane keeping function system. The server 200 includes a controller 210 and a database 220. The controller 210 can be configured with a central processing unit such as a CPU, and a program (software) that causes the controller 210 to function.

The controller 210 of the server 200 includes a communication module 212 that transmits and receives information to and from the vehicles 100, 300, 400 . . . , a use information acquisition module 214 that acquires, from the vehicles 100, 300, 400 . . . having the lane keeping function, use information of the lane keeping function during travel, a use rate calculator 215 that calculates the use rate (temporary stop rate) of the lane keeping function on the basis of the use information of the lane keeping function, a region extractor 216 that extracts a region (section) having a low use rate, an environment information acquisition module 217 that acquires environment information from the vehicles 100, 300, 400 . . . , a position information acquisition module 218 that acquires position information of the vehicles 100, 300, 400 . . . , and a notification information generator 219 that generates notification information to be transmitted to the vehicles 100, 300, 400 . . . on the basis of the use rate. The communication module 212 transmits the notification information based on the use rate to a given vehicle having the lane keeping function. Additionally, the server 200 may include a communication module separately from the controller 110, and the communication module may transmit and receive information to and from the vehicles 100, 300, 400 . . . in accordance with the processing of the communication module 212.

As discussed above, if lanes are worn out or dirty in an image recognized by the camera assembly 150, the lanes are difficult to see in some cases. Not only the condition (the extent of deterioration) of the lanes themselves, but weather also has influence on whether the camera assembly 150 can easily recognize lanes. For example, puddles of rainwater on roads make the image analysis of the lanes difficult. In this case, the controller 110 can no longer recognize the lanes correctly. Accordingly, the vehicle 100 would fail to sufficiently demonstrate the lane keeping function.

If it becomes difficult to recognize lanes while the vehicle 100 is traveling and following the lanes with the lane keeping function, the lane keeping function is temporarily stopped. Specifically, once the image analyzer 112 can no longer recognize lanes, the lane keeping function is temporarily stopped. Once lanes can be recognized again afterwards, the use of the lane keeping function is resumed. When the lane keeping function is temporarily stopped, it is indicated on the display device 170 that the lane keeping function is temporarily stopped.

Meanwhile, it is desirable for the driver of the vehicle 100 to drive the vehicle 100 in the situation in which the lane keeping function can be used as continuously as possible. If a driver is notified in advance that the lane keeping function is going to temporarily stop, the driver can prepare for the temporary stop of the lane keeping function. It is thus possible to transition to the normal driving when the lane keeping function temporarily stops.

Accordingly, if there is the possibility that the lane keeping function temporarily stops, a driver is notified in advance in the present implementation that there is the possibility that the lane keeping function temporarily stops. The server 200 makes information (use information) on temporary stops of the lane keeping function more accurate and reliable by collecting the use information from vehicles. For example, if a specific section of a specific road has lanes deteriorated, there is a higher probability that the lane keeping function of a vehicle that passes through that section temporarily stops. The server 200 collects information on temporary stops of the lane keeping function from vehicles that travel in that section, and obtains the probability (temporary stop rate) of a temporary stop, on the basis of the collected information. The temporary stop rate is a parameter representing the use rate of the lane keeping function. If the temporary stop rate is high, the lane keeping function is not sufficiently used in that section, and there is the possibility that the lane keeping function of vehicles that are going to pass through the section temporarily stops. Accordingly, the server 200 generates notification information according to the temporary stop rate and sends the generated notification information in advance to the vehicles that are going to pass through the section, thereby notifying the vehicles of the possibility that the lane keeping function temporarily stops. This allows the drivers of the notified vehicles to recognize in advance that there is a high probability that the lane keeping function temporarily stops, and to drive the respective vehicles optimally when the lane keeping function temporarily stops.

If the temporary stop rate is considerably high, notification information for automatically stopping the lane keeping function is generated and transmitted from the server 200 to vehicles. This allows the vehicles that have received the notification information to temporarily stop the lane keeping function in advance in a section in which there is a high possibility that the lane keeping function temporarily stops.

Notification information for changing map information is transmitted from the server 200 to vehicles, on the basis of the temporary stop rate, in a region in which the use rate of the lane keeping function is low. This causes the map information changer 117 of the controller 110 to change the map information of the navigation system 180 of the vehicle. Based on the changed map information, the driver can thus recognize, in advance, a region in which the lane keeping function is likely to temporarily stop. Further, if the temporary stop rate of the lane keeping function is relatively high, it is conceivable to maintain the lane keeping function with no temporary stop by complementarily indicating, on the map information, that the temporary stop rate of the lane keeping function is relatively high. This makes it possible to easily construct the system without using a new sensor or large map data.

In the present implementation, as described above, the server 200 analyzes temporary stop information of the lane keeping function acquired from vehicles, obtains information on the probability that the lane keeping function temporarily stops, and notifies the driver in advance on the basis of this information, or reflects this information on the map information of the navigation system 180 for a vehicle.

Further, the situation in which there is the possibility that a temporary stop of the lane keeping function is operated is calculated in the form of probability in accordance with environment information such as time and weather, and notification information is transmitted to the vehicle on the basis of the temporary stop rate according to the environment information, thereby informing the driver of the possibility of temporary stops step by step in accordance with the situation. The driver may be quantitatively notified of the possibility of temporary stops on the basis of numerical values. The driver knows in advance that the lane keeping function is going to temporarily stop. Accordingly, the driver does not have to address the temporary stop in a hurry, but can drive calmly.

Figure 2:
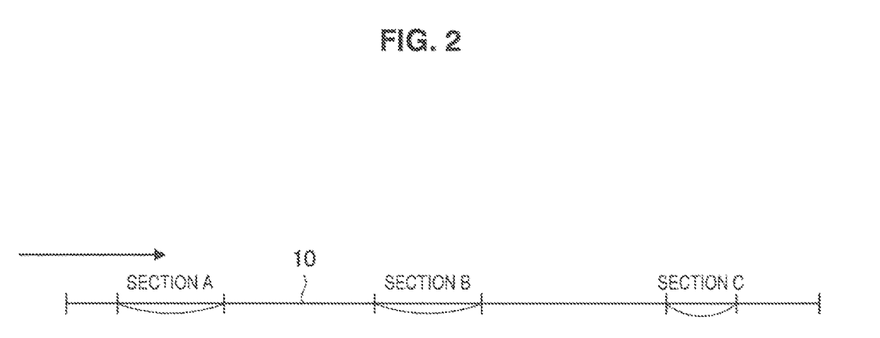
FIG. 2 is a schematic diagram illustrating a route on which a vehicle travels.

The following describes an example in which, when a vehicle travels on a route 10 as illustrated in FIG. 2, the server 200 collects the probability that the lane keeping function is temporarily stopped in three sections A, B, and C on the route 10. As an example, the sections A, B, and C are taken on the basis of traveling places in which the lane keeping function temporarily stops N times or more within X [m]. The probability that the lane keeping function temporarily stops may be obtained for each of areas subdivided in advance on the basis of the map data.

Figure 3:
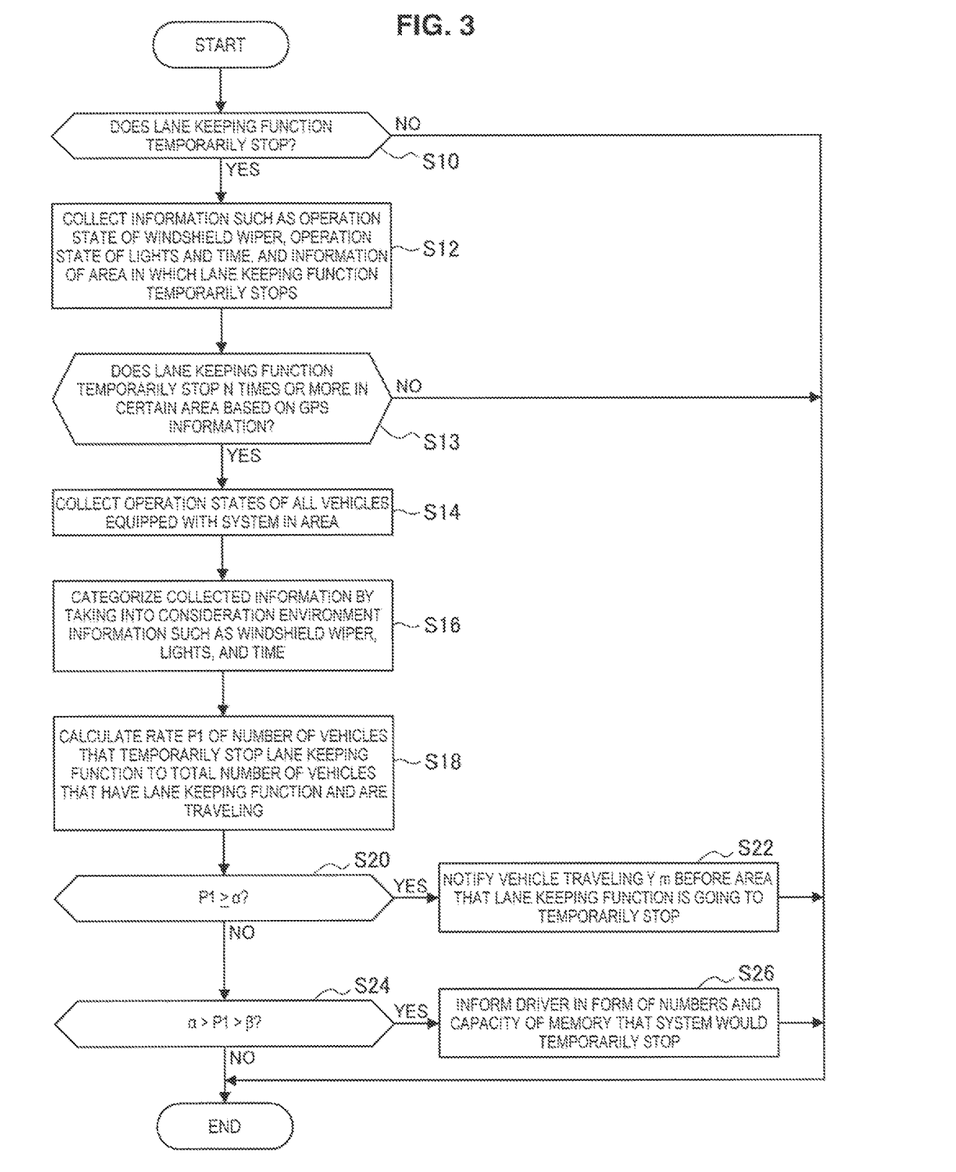
FIG. 3 is a flowchart illustrating processing performed by a server.

FIG. 3 is a flowchart illustrating the processing performed by the server 200. First of all, in step S10, the server 200 communicates with control devices 100, 300, 400 . . . for vehicles coupled to the server 200, and determines whether the lane keeping function temporarily stops in each vehicle. If the lane keeping function temporarily stops, the flow proceeds to step S12. In step S12, environment information such as the operation states of the windshield wiper and the lights at the time of a temporary stop from a vehicle that temporarily stops the lane keeping function, and the time of the temporary stop, position information (GPS information) of the region in which the vehicle temporarily stops the lane keeping function are collected from the vehicle that temporarily stops the lane keeping function. Meanwhile, if the lane keeping function does not temporarily stop, the flow terminates the processing (END). In this step S12, all the information on the temporary stops of the lane keeping function that all the vehicles communicably coupled to server 200 have had so far is acquired from all the vehicles.

The flow proceeds to step S13 after step S12. In step S13, it is determined on the basis of the position information whether the lane keeping function temporarily stops N times or more in a certain area (a section having a distance X [m] or less as an example). If the lane keeping function temporarily stops N times or more, the flow proceeds to step S14. In the example illustrated in FIG. 2, the lane keeping function temporarily stops N times or more within X [m] in each of the sections A, B, and C. The sections A, B, and C thus satisfy the condition of step S13. An advance notification of temporary stops may be issued on the basis of data of only information having N or more temporary stops.

In step S14, use information on the use state (operation state) of the lane keeping function is collected from all the vehicles that can communicate with the server 200 in each area (each of the sections A, B, and C), in which the lane keeping function temporarily stops N times or more. The information to be collected here includes environment information such as the time at which the lane keeping function temporarily stops, the operation state of the windshield wiper, and the operation state of the lights in addition to information on the presence or absence of temporary stops.

Next, in step S16, categories are created by taking into consideration the environment information such as the operation states of the windshield wiper and the lights at the time of a temporary stop, and the time of the temporary stop in each of the sections A, B, and C. It is possible here to estimate the weather at the time of a temporary stop, in accordance with the operation state of the windshield wiper at the time of the temporary stop. If the windshield wiper is in operation at the time of the temporary stop, it is possible to estimate that it is rainy. It is also possible to estimate a period of time in which the lane keeping function temporarily stops (i.e., whether the lane keeping function temporarily stops in the daytime or nighttime) in accordance with the time of the temporary stop and the operation state of the lights at the time of the temporary stop. It is possible in this way to acquire environment information such as the period of time in which the lane keeping function temporarily stops and the weather in which the lane keeping function temporarily stops, on the basis of information such as the time of the temporary stop, and the operation state of the windshield wiper and the operation state of the lights, and to categorize information collected in each of the sections A, B, and C in accordance with the environment information. Next, in step S18, a rate P1 (temporary stop rate P1) of the number of vehicles that temporarily stop the lane keeping function to the total number of vehicles that can communicate with the server 200 in the categories of the sections A, B, and C is calculated.

Figure 4:
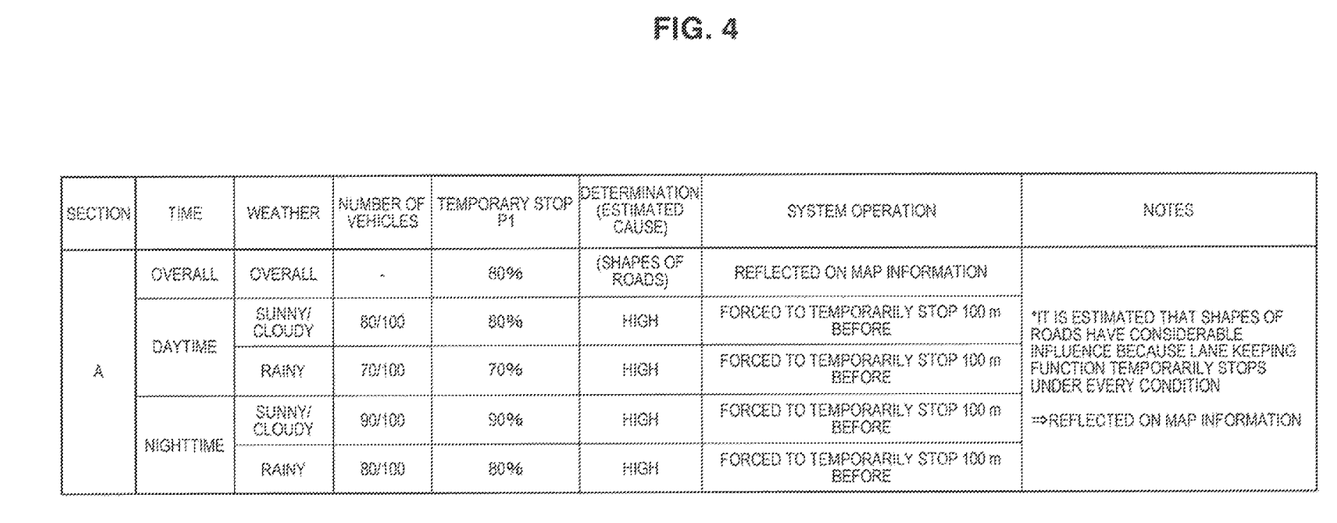
FIG. 4 is a schematic diagram illustrating a temporary stop rate P1 of a category created in steps S16 and S18 of FIG. 3 for a section A.
Figure 5:
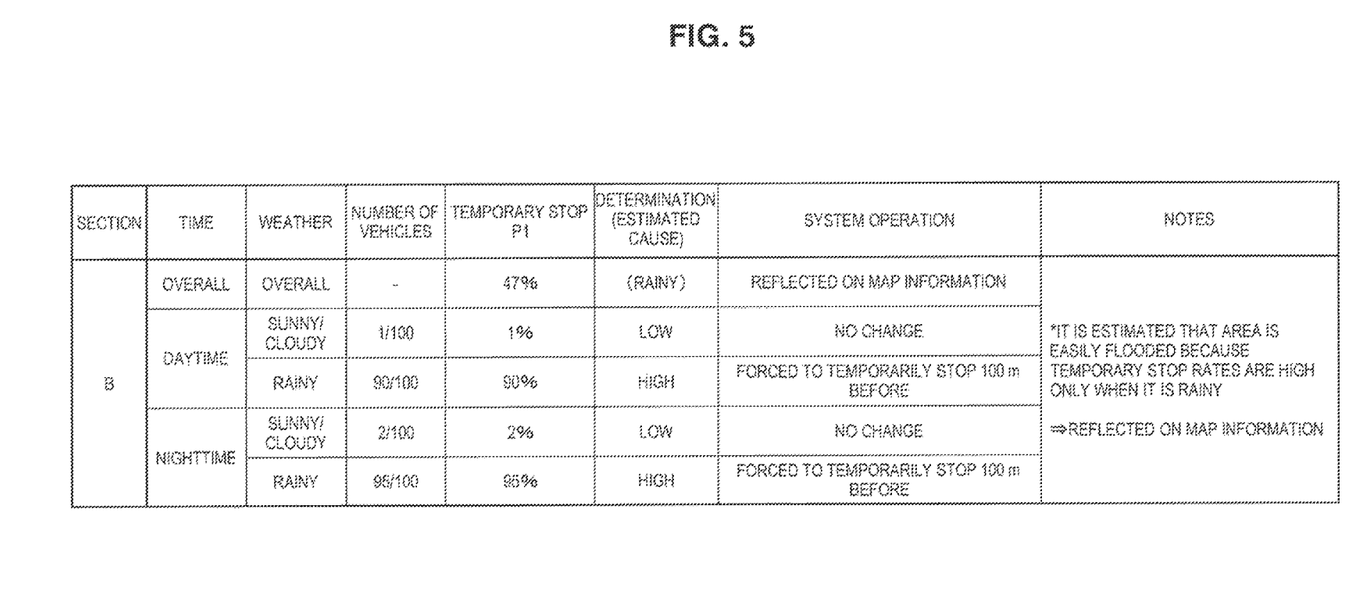
FIG. 5 is a schematic diagram illustrating a temporary stop rate P1 of a category created in steps S16 and S18 of FIG. 3 for a section B.
Figure 6:
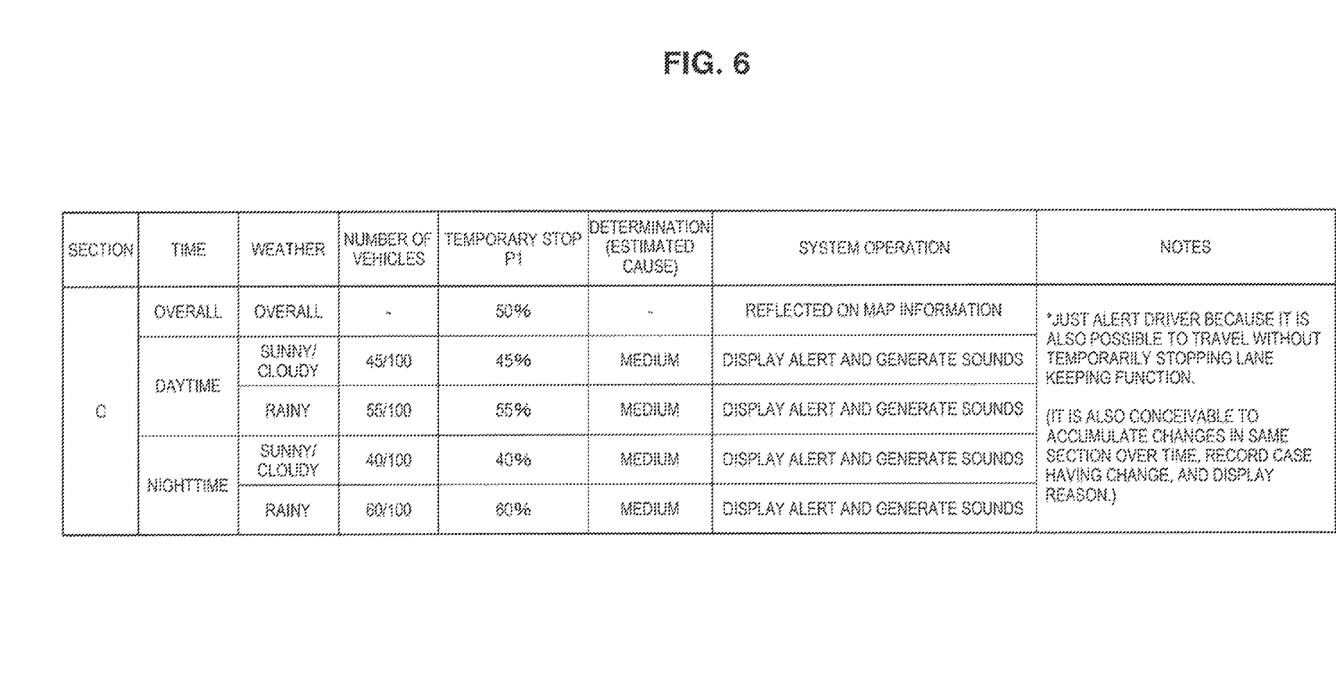
FIG. 6 is a schematic diagram illustrating a temporary stop rate P1 of a category created in steps S16 and S18 of FIG. 3 for a section C.

FIGS. 4 to 6 are schematic diagrams illustrating temporary stop rates P1 of categories created in steps S16 and S18 of FIG. 3 for the sections A, B, and C. The temporary stop rates P1 of the categories of the sections A, B, and C respectively illustrated in FIGS. 4 to 6 are calculated by the use rate calculator 215 of the server 200, and stored in the database 220.

As illustrated in FIG. 4, the overall temporary stop rate P1 including all the periods of time (daytime and nighttime) and all the kinds of weather (sunny, cloudy, and rainy) is 80% in the section A. When it is sunny or cloudy in the daytime, the temporary stop rate P1 is 80%. When it is rainy in the daytime, the temporary stop rate P1 is 70%. When it is sunny or cloudy in the nighttime, the temporary stop rate P1 is 90%. When it is rainy in the nighttime, the temporary stop rate P1 is 80%. Periods of time are categorized into daytime and nighttime on a 12-hour basis, but may also be categorized in more detail (e.g., on a 6-hour basis).

As illustrated in FIG. 5, the overall temporary stop rate P1 is 47% in the section B. When it is sunny or cloudy in the daytime, the temporary stop rate P1 is 1%. When it is rainy in the daytime, the temporary stop rate P1 is 90%. When it is sunny or cloudy in the nighttime, the temporary stop rate P1 is 2%. When it is rainy in the nighttime, the temporary stop rate P1 is 95%.

As illustrated in FIG. 6, the overall temporary stop rate P1 is 50% in the section C. When it is sunny or cloudy in the daytime, the temporary stop rate P1 is 45%. When it is rainy in the daytime, the temporary stop rate P1 is 55%. When it is sunny or cloudy in the nighttime, the temporary stop rate P1 is 40%. When it is rainy in the nighttime, the temporary stop rate P1 is 60%.

In the processing in step S20 and following steps of FIG. 3, the vehicle 100 is notified on the basis of the temporary stop rate P1. In step S20, the temporary stop rates P1 of the categories of each of the sections A, B, and C are compared with a predetermined threshold $\alpha$ to determine whether P1≥$\alpha$ is satisfied. The value of $\alpha$ is 70% as an example. If P1≥$\alpha$, the flow proceeds to step S22. In step S22, the driver of a vehicle traveling Y [m] before the area is notified in advance that the lane keeping function is going to temporarily stop. As an example, Y is equal to 100 [m].

As illustrated in FIG. 4, the temporary stop rates P1 are 70% or more under every condition in the section A. Accordingly, the determination about whether the lane keeping function temporarily stops shows "high" under every condition irrespective of any period of time or weather. Accordingly, the server 200 generates notification information indicating that lane keeping function is going to temporarily stop, and transmits the generated notification information to vehicles traveling 100 m before the section A under every condition irrespective of any period of time or weather, thereby notifying the drivers in advance, and generating and transmitting notification information for forcing the lane keeping function to automatically stop. The vehicles that have received the notification information issue warning to the drivers and stop the lane keeping function. The vehicles that receives the notification 100 m before the section A first issue warning to the drivers, and then stop the lane keeping function. This allows the drivers to smoothly transition from driving with the lane keeping function to the normal driving.

The temporary stop rates P1 are 70% or more under every condition irrespective of any period of time or weather in the section A, and it is thus estimated that the shapes of roads have a considerable influence as a cause of temporary stops. In addition, notification information to be reflected on the map information of the navigation system 180 is generated and transmitted to each vehicle from the server 200. It is reflected on the map information in each vehicle that the shapes of the roads in the section A easily cause the lane keeping function to temporarily stop, and the map information is displayed on the display device 170. This makes it possible to alert the drivers on the basis of the map information that the lane keeping function is likely to temporarily stop in the section A.

As illustrated in FIG. 5, the temporary stop rate P1 is 70% or higher in the section B only when it is rainy. Accordingly, the determination about whether the lane keeping function temporarily stops shows "high" when it is rainy. The controller 210 of the server 200 thus generates notification information indicating that the lane keeping function is going to temporarily stop, and transmits the generated notification information to vehicles traveling 100 m before the section B when it is rainy, thereby notifying the drivers in advance. In addition, the controller 210 of the server 200 generates and transmits notification information for forcing the lane keeping function to automatically stop. The vehicles that have received the notification information issue warning to the drivers and stop the lane keeping function. Receiving the environment information of each vehicle, the server 200 can determine from the operation state of the windshield wiper whether the vehicle is traveling in the rain. Accordingly, the server 200 can send the notification information to only the vehicles traveling in the rain. The server 200 may also generate notification information indicating that the lane keeping function is temporarily stopped only when it is rainy, and transmit the generated notification information to all the vehicles traveling 100 m before the section B. In this case, the vehicles determine from the operation state of the windshield wiper whether the vehicles are traveling in the rain, and issue warning to the drivers and temporarily stop the lane keeping function only if the vehicles are traveling in the rain.

The temporary stop rates P1 are 70% or higher in the section B only when it is rainy, and it is thus estimated that the section B is easily flooded. In addition, notification information to be reflected on the map information of the navigation system 180 is generated and transmitted to each vehicle from the server 200. It is reflected on the map information in each vehicle that the section B is easily flooded, and the map information is displayed on the display device 170. This makes it possible to alert the drivers on the basis of the map information that the lane keeping function is likely to temporarily stop in the section B.

Meanwhile, if P1<α in step S20 of FIG. 3, the flow proceeds to step S24. In step S24, P1 is compared with predetermined thresholds α and β. It is then determined whether α>P1>β is satisfied. The value of β is 30% as an example. If α>P1>β, the flow proceeds to step S26, and a driver is notified in advance that there is the possibility that the lane keeping function temporarily stops. The flow terminates the processing after steps S22 and S26.

As illustrated in FIG. 6, the temporary stop rates P1 are 30% or more and less than 70% under every condition in the section C. Accordingly, the determination about whether the lane keeping function temporarily stops shows "medium" under every condition irrespective of any period of time or weather. In this case, it is also possible that vehicles traveling in the section C can travel without temporarily stopping the lane keeping function. Accordingly, notification information for alerting drivers is generated, and the generated notification information is transmitted to the vehicles traveling 100 m before the section C under every condition. The vehicles that have received this notification information alert the drivers that there is the possibility that the lane keeping function temporarily stops. Examples of methods for alerting drivers include displaying alert on the display device 170 and generating warning sounds from the voice generation device 175.

If α>P1>β is not satisfied in step S24, the flow terminates the processing. The server 200 thus transmits no information to vehicles if P1≤β.

According to the present implementation as described above, the server 200 can collect information on temporary stops of the lane keeping function, and transmit notification information to vehicles traveling before sections in which there is a high probability that the lane keeping function temporarily stops. The vehicles that have received the notification information can take appropriate measures such as automatically stopping the lane keeping function in advance and issuing warning to the drivers on the basis of the notification information.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

According to the present invention as described above, it is possible to notify a driver of a vehicle on the basis of real-time use information of a lane keeping function whether the lane keeping function can be used.

The invention claimed is:

1. An information processing device, comprising:
   circuitry configured to:
   acquire, from a plurality of vehicles each of which has a lane keeping function of allowing each of the plurality of vehicles to travel along a lane, use information of the lane keeping function during a travel;
   extract a region in which a temporary stop rate of the lane keeping function is greater than or equal to a first threshold, on the basis of the use information, wherein the temporary stop rate corresponds to a ratio of a count of vehicles that temporarily stop the lane keeping function in the region to a count of the plurality of vehicles; and
   transmit notification information for stopping the lane keeping function to a given vehicle of the plurality of vehicles when the temporary stop rate is greater than or equal to the first threshold.

2. The information processing device according to claim 1, wherein the circuitry is further configured to:
   acquire position information of the given vehicle having the lane keeping function, and
   transmit the notification information to the given vehicle traveling before the region.

3. The information processing device according to claim 2, wherein the circuitry is further configured to transmit, as the notification information, warning information indicating a possibility that the lane keeping function stops when the temporary stop rate of the lane keeping function is less than the first threshold and greater than a second threshold.

4. The information processing device according to claim 1, wherein the circuitry is further configured to transmit, as the notification information, warning information indicating a possibility that the lane keeping function temporarily stops.

5. The information processing device according to claim 1, wherein the circuitry is further configured to transmit the notification information for the given vehicle to reflect the notification information on map information of a navigation system.

6. The information processing device according to claim 1, wherein the circuitry is further configured to calculate the temporary stop rate on the basis of the use information.

7. The information processing device according to claim 6, wherein the circuitry is further configured to:
   acquire, from the plurality of vehicles, environment information indicating environments outside the plurality of vehicles;
   calculate the temporary stop rate in accordance with the environment information for each region; and
   transmit the notification information generated on the basis of the temporary stop rate and the environment information.

8. The information processing device according to claim 7, wherein the environment information is information indicating a time at which the lane keeping function temporarily stops, information indicating an operation state of a windshield wiper of at least one vehicle of the plurality of vehicles at the time at which the lane keeping function temporarily stops, or information indicating an operation state of a light of the at least one vehicle of the plurality of vehicles at the time at which the lane keeping function temporarily stops.

9. The information processing device according to claim 1, wherein the circuitry is further configured to generate the notification information on the basis of the temporary stop rate.

10. An information processing method, comprising:
acquiring, from a plurality of vehicles each of which has a lane keeping function of allowing each of the plurality of vehicles to travel along a lane, use information of the lane keeping function during a travel;
extracting a region in which a temporary stop rate of the lane keeping function is greater than or equal to a threshold, on the basis of the use information,
wherein the temporary stop rate corresponds to a ratio of a count of vehicles that temporarily stop the lane keeping function in the region to a count of the plurality of vehicles; and
transmitting notification information for stopping the lane keeping function to a given vehicle of the plurality of vehicles when the temporary stop rate is greater than or equal to the threshold.

11. A control device for a vehicle, the control device comprising:
circuitry configured to:
acquire use information of a lane keeping function of allowing the vehicle to travel along a lane;
transmit the use information to a server;
receive, from the server, notification information for a region in which a temporary stop rate of the lane keeping function is greater than or equal to a threshold, wherein
the temporary stop rate is calculated by the server on the basis of the use information of a plurality of vehicles,
the temporary stop rate corresponds to a ratio of a count of vehicles that temporarily stop the lane keeping function in the region to a count of the plurality of vehicles,
each of the plurality of vehicles has the lane keeping function, and
the plurality of vehicles includes the vehicle; and
stop the lane keeping function on the basis of the notification information.

12. The control device for the vehicle according to claim 11, wherein the circuitry is further configured to generate a warning indicating a possibility that the lane keeping function temporarily stops, on the basis of the notification information.

13. The control device for the vehicle according to claim 11, wherein the circuitry is further configured to change map information of a navigation system on the basis of the notification information.

14. The control device for the vehicle according to claim 11, wherein the circuitry is further configured to:
acquire environment information;
transmit the environment information along with the use information; and
receive the notification information based on the temporary stop rate calculated by the server in the region in accordance with the environment information.

15. The control device for the vehicle according to claim 14, wherein the environment information comprises information indicating a time at which the lane keeping function temporarily stops, information indicating an operation state of a windshield wiper of the vehicle at the time at which the lane keeping function temporarily stops, or information indicating an operation state of a light of the vehicle at the time at which the lane keeping function temporarily stops.

16. A control method for a vehicle, the control method comprising:
acquiring use information of a lane keeping function of allowing the vehicle to travel along a lane;
transmitting the use information to a server;
receiving, from the server, notification information for a region in which a temporary stop rate of the lane keeping function is greater than or equal to a threshold, wherein
the temporary stop rate is calculated by the server on the basis of the use information of a plurality of vehicles,
the temporary stop rate corresponds to a ratio of a count of vehicles that temporarily stop the lane keeping function in the region to a count of the plurality of vehicles,
each of the plurality of vehicles has the lane keeping function, and
the plurality of vehicles includes the vehicle; and
stopping the lane keeping function on the basis of the notification information.

* * * * *